United States Patent

[11] 3,627,603

| [72] | Inventor | James W. Greig<br>Grosse Pointe Park, Mich. |
|---|---|---|
| [21] | Appl. No. | 801,563 |
| [22] | Filed | Feb. 24, 1969 |
| [45] | Patented | Dec. 14, 1971 |
| [73] | Assignee | Woodall Industries Inc. |

[54] METHOD OF MAKING REINFORCED FOAM PLASTIC PRODUCTS
7 Claims, 7 Drawing Figs.

[52] U.S. Cl. .................................... 156/79, 264/47, 264/52
[51] Int. Cl. ......................................... B32b 5/20
[50] Field of Search ............................ 156/79, 497, 78, 359, 277, 77; 264/45, 47, 48, 52, 54

[56] References Cited
UNITED STATES PATENTS

| 1,610,286 | 12/1926 | Hood et al. | 156/79 X |
| 1,958,131 | 5/1934 | Davidson | 156/79 |
| 2,728,702 | 12/1955 | Simon et al. | 156/79 X |
| 2,956,310 | 10/1960 | Roop et al. | 156/79 X |
| 2,962,406 | 11/1960 | Rosa | 156/79 UX |
| 3,159,695 | 12/1964 | Behringer | 264/93 |
| 3,174,887 | 3/1965 | Voelker | 156/79 |
| 2,825,282 | 3/1958 | Gergen et al. | 264/52 X |

Primary Examiner—Benjamin A. Borchelt
Assistant Examiner—G. E. Montone
Attorney—Harness, Dickey & Pierce ABSTRACT: A laminated structural panel consisting of two plastic saturated sheets on opposite sides of a rigid foam plastic core. The core is foamed and cured between the sheets, each of which has previously been united with a fiber matting. The matting disperses throughout the core as it is foamed to reinforce the core and mechanically hold it to the sheets.

PATENTED DEC 14 1971
3,627,603
SHEET 1 OF 3
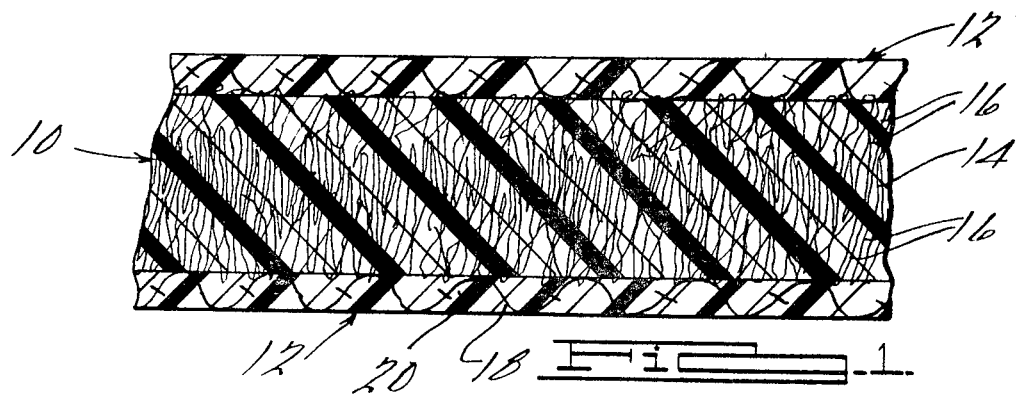
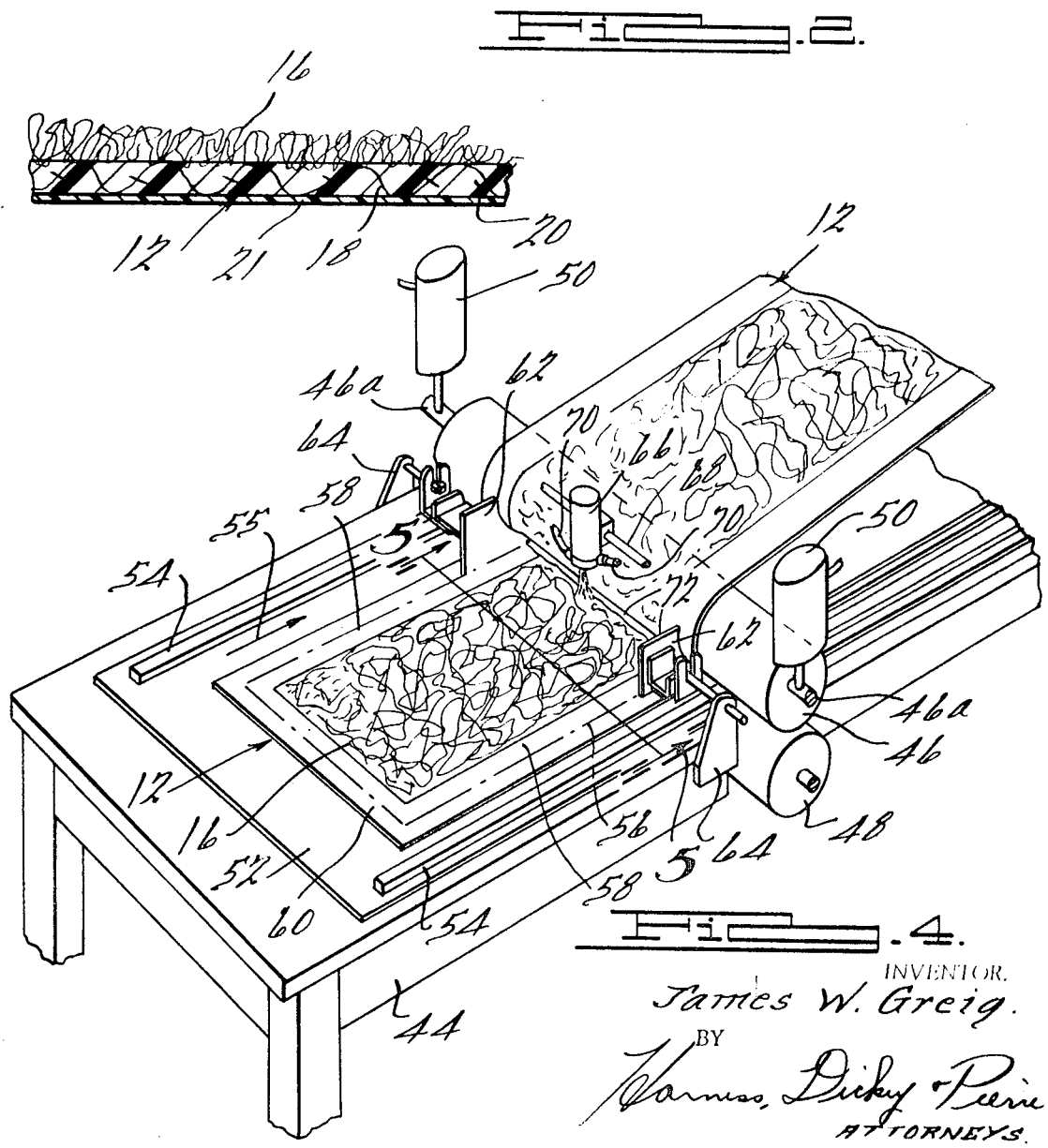
INVENTOR.
James W. Greig.
BY
Harness, Dickey & Pierce
ATTORNEYS

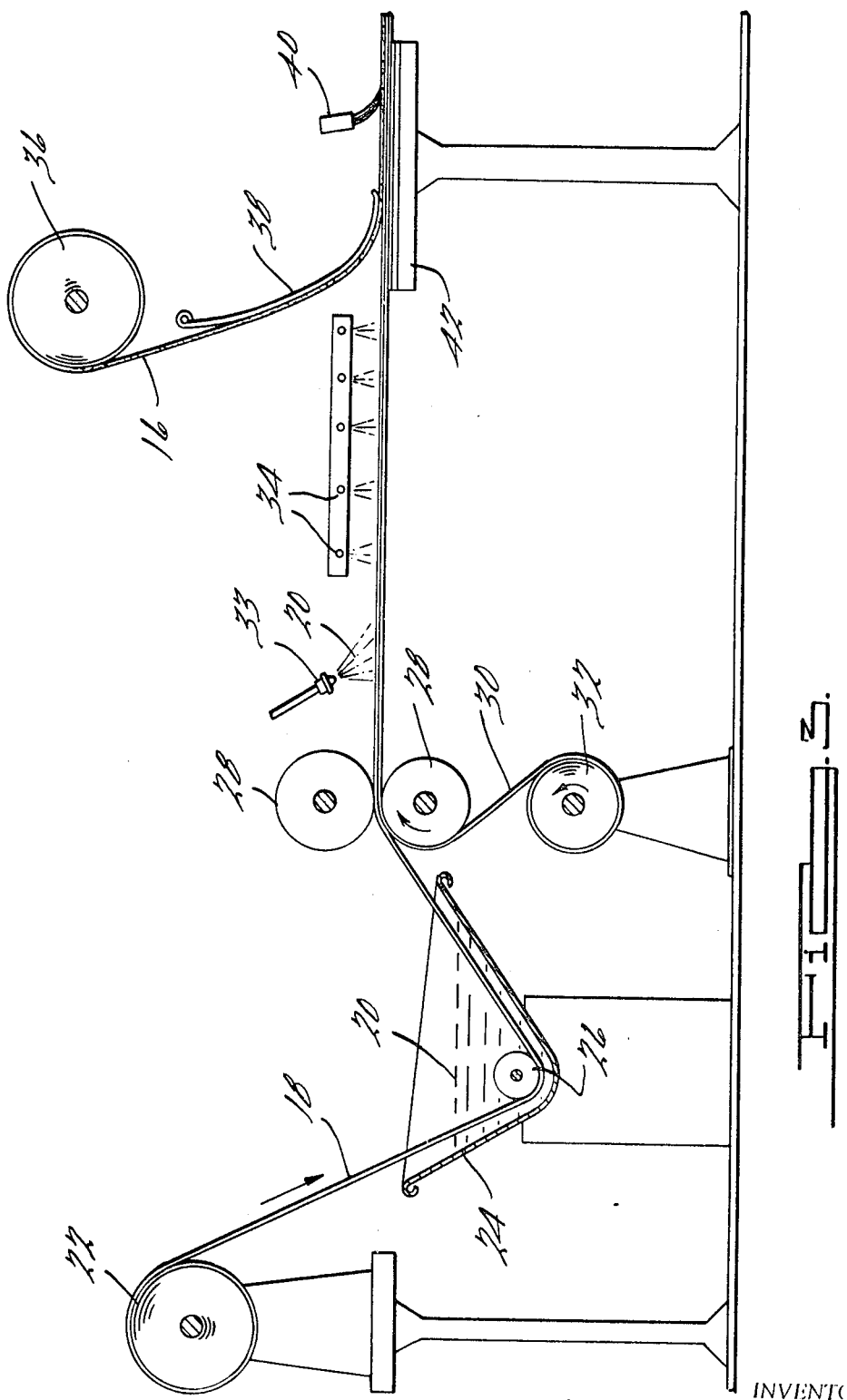

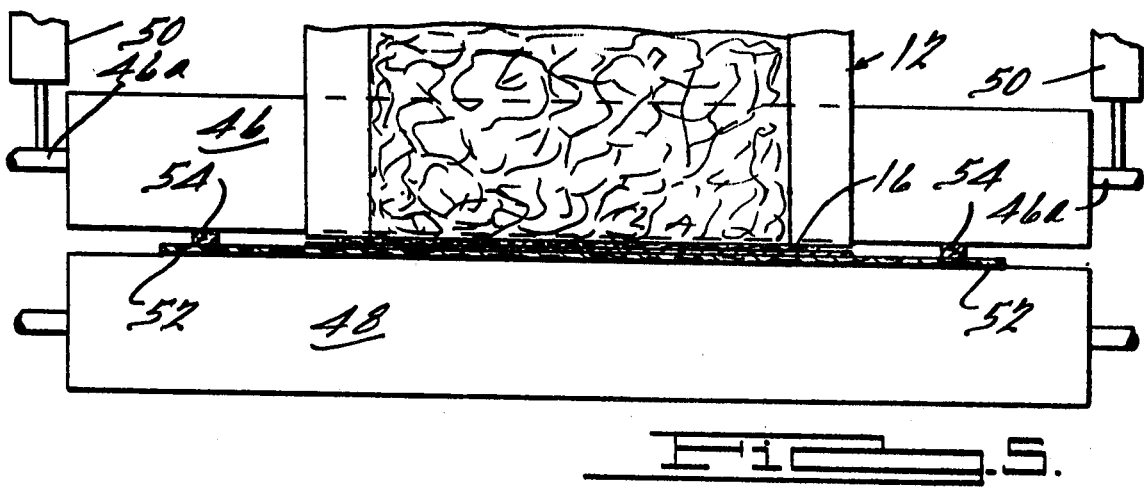
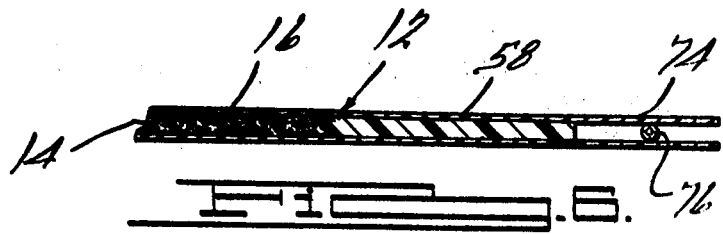
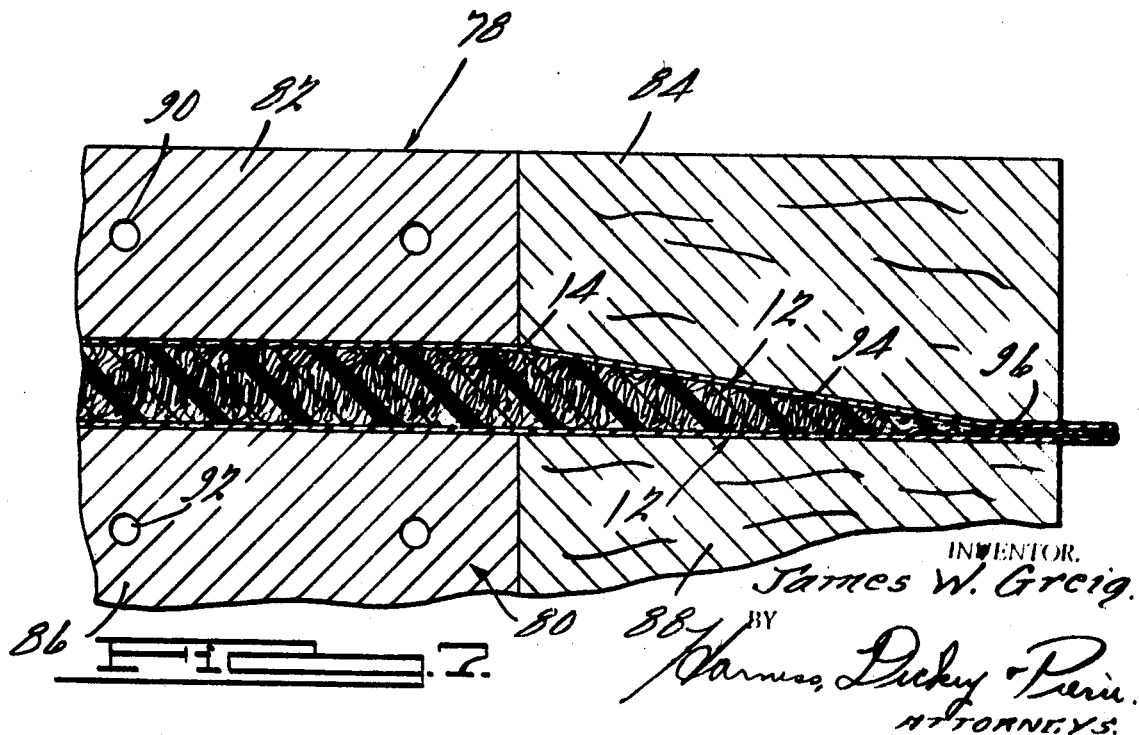

METHOD OF MAKING REINFORCED FOAM PLASTIC PRODUCTS

BACKGROUND AND OBJECTS OF THE INVENTION

Laminated panels have many applications in the building construction field and in the fabrication of vehicles, appliances, and other relatively large manufactured articles. While the panel illustrated herein has been found to be particularly useful as trim or as an interior wall defining element in aircraft and other vehicles, it is to be understood that this panel may be adapted for a wide variety of uses and is not limited to use in any one particular field.

There has been an increasing use of foam plastics in the manufacture of structural laminated products. Cellularized material has the advantage of light weight variable strength and high insulating value, resistance to heat, and properties which are desirable in a wide variety of applications. A need for such properties is frequently combined with a requirement for high structural strength. For this reason it has been proposed that foam plastic to be used in a structural laminate might be reinforced with loose fibers of fiberglass, or the like, to improve its structural strength.

One of the problems with using foam plastic in a laminate is the poor adhesion of the foam plastic to the adjacent lamina. The foam plastic itself makes a rather poor bonding agent, particularly because of the large portion of its surface area which is occupied by the cells. Accordingly, when a laminate embodying a foam plastic layer is subjected to various stresses, the bond between the foam and its adjacent lamina tends to rupture, with consequent weakening of the overall product. The present invention is intended to overcome this problem by mechanically uniting the foam plastic core of a panel to the panel cover sheets by means of matting which is used to reinforce the foam core. Accordingly, it is a primary object of the present invention to provide a laminated panel in which the several panel laminae are mechanically joined together to cooperatively resist imposed stresses and exhibit an improved resistance to rupture of the bond between the laminae.

It is another object of the present invention to provide a method of manufacturing a plastic laminate embodying a reinforced foam plastic core which will minimize the tendency of uncontrolled outside air to enter the core as it foamed and impair the structural soundness of the core.

It is another object of the present invention to provide a method of making a panel with a foam plastic core which will permit varying the density and thickness of the core between different areas thereof and which will permit the entire laminate to be contoured to various shapes.

It is still another object of the present invention to provide a plastic laminate of the above character which is extremely durable in construction, flame and smoke resistant, inexpensive to manufacture and attractive in appearance.

SUMMARY OF THE INVENTION

According to the present invention, a laminate is utilized which consists of plastic impregnated sheets disposed on opposite sides of a foam plastic core. The sheets have loose fiber mats protruding from one side thereof. If the sheets are porous then impervious removable layers are positioned on the outer sides of the sheets. The core is foamed in place between the sheets so as to envelop and comingle the untrapped portions of the mats. By this means the mats provide a very secure mechanical lock between the core and the surface laminae or cover sheets, preventing a separation of the core from the cover sheets and reinforcing the core. When the plastic to be foamed is poured between the two surface laminae, it is poured over a greater area of the sheets than is covered by the mats. This forms a seal around the mats to prevent external air from entering the core during the foaming operation. The unmatted margins of the resulting panel are then trimmed as waste. To this same end, a sealant is laid along margins of the sheets around the core.

BRIEF DESCRIPTION OF THE DRAWINGS

FIG. 1 is a fragmentary sectional view of a reinforced plastic laminant embodying the present invention;

FIG. 2 is a fragmentary sectional view of a surface lamina prepared for use in the fabrication of the laminant illustrated in FIG. 1;

FIG. 3 is a schematic view of the manufacturing operation used to fabricate the surface lamina illustrated in FIG. 2;

FIG. 4 is a perspective view showing the method of and apparatus for manufacturing the laminant of FIG. 1 from the surface lamina shown in FIG. 2;

FIG. 5 is an enlarged sectional view, with parts removed, of the structure illustrated in FIG. 4, taken generally along the line 5—5 thereof;

FIG. 6 is a sectional view of a portion of the laminate structure of FIG. 1 during one step in its fabrication; and FIG. 7 is a sectional view of mold structure used to foam and shape the laminate of FIG. 1.

DETAILED DESCRIPTION OF THE PREFERRED EMBODIMENTS

Referring now to FIG. 1, the numeral 10 refers generally to the reinforced laminate embodying the present invention. This laminate will be seen to comprise a pair of surface laminae or skin layers 12 disposed on opposite sides of and covering a rigid foam plastic core 14. The layers 12 are each provided with a loose fiber mat 16 secured to the inner side thereof, which mats are randomly disposed within the core 14. Each layer 12 comprises a porous or saturable sheet 18 which is impregnated with a plastic saturant 20. The sheet 18 is illustrated as consisting of a woven fiberglass fabric although other saturable sheets such as paper, or the like, may also be utilized. A variety of different plastics may be utilized to saturate the sheet 18, although various thermosetting polyester resins have been found to be well suited for this purpose. The mats 16 desirably consist of loosely matted fiberglass filaments. The mats 16 are illustrated as being of the continuous strand type, but cut filaments could also be used. The core 14 can be made from various foam plastics or other cellular materials. One successful core has consisted of rigid polyurethane having a freon foaming agent.

The laminate 10 of FIG. 1 is manufactured by the use of the equipment illustrated in FIG. 4. Prior to this step, however, the surface layers 12 are fabricated in a separate operation. Suitable equipment for fabricating the surface layers 12 is illustrated in FIG. 3. FIG. 3 shows a roll 22 of fiberglass woven fabric 18 which is shown to extend from the roll 22 into a vessel 24 containing liquid polyester resin 20. The fabric 18 passes under a roller 26 within the vessel 24 and emerges from the vessel to pass between a pair of calendar rolls 28 which control the amount of saturation be squeezing out excess resin. At the same time a layer of impervious material 30 having an extremely smooth surface finish is positioned on the lower side of the fabric 18. The material 30 may consist of cellophane, mylar, foil, or coated parchment, for example. As the fabric 18 passes from the calender rolls 28, a small quantity of additional resin 20 may be sprayed to the upper side of it from a nozzle 33. The additional resin 20 sprayed on by the nozzle 33 enhances the subsequent bonding function. The upper side of the sheet is then subjected to a preliminary drying action by means of heating elements 34. This increases the viscosity of the resin 20 and improves its ability to hold individual loops or portions of the mat 16. Immediately after passing from beneath the heating elements 34, the fabric 18 has the mat 16 laid onto it, the mat being fed from a roll 36. The mat 16 is of a narrower width than the fabric 18. The mat 16 is pressed onto the fabric 18 by means of a flexible metal shoe 38. The shoe 38 assures that an adequate portion of the matting 16 will be embedded in the resin 20. The shoe 38 presses downwardly on the fabric 18 which is supported at this point by a table 42. Thereafter, a flexible brush 40 engages the mat 16 to fluff it and cause a substantial portion of the mat to raise up above the resin 20. The mat 16 may also be fluffed by use of air jets or such other means as will assure that only the desired proportion of the mat is embedded in the resin 20. The product 12 emerging from the right-hand end of the apparatus shown in FIG. 3 is fed through a drying oven (not shown) where the resin 20 is cured and dried to permanently lock the matting 16 to the resin 20. Rolls of the matted surface layer material 12 may then be sorted for subsequent use in the fabrication of the panels 10.

While the manufacture of the skin or surface lamina 12 is desirably accomplished in a continuous operation, the panels 10 are manufactured individually. For this purpose a pair of equal lengths of surface layer material 12 are cut from a storage roll of said material. As illustrated in FIG. 4, the laminae 12 are positioned over a table 44 with their mats 16 in confronting relation and are adapted to be fed between an upper squeeze roller 46 and a lower squeeze roller 48 supported on the table 44. The lower squeeze roller 48 is rotatable about a fixed axis, while the upper roller 46 is pressed downwardly toward the roller 48 by a pair of air cylinders 50 which are schematically shown in association with a supporting shaft 46a of the roller 46. The lower lamina 12 is placed on a caul 52 between a pair of longitudinally extending shims 54 positioned on the caul. The caul 52 is fed between the rollers 46 and 48 along with the laminae 12 in the direction of an arrow 55.

As illustrated in FIG. 4, the narrower width of the mat 16 leaves unmatted side margins 58 of the sheet 18 on opposite sides of the mat. In addition, the opposite ends of each sheet 18 have the matting 16 scraped away so as to leave matted end margins 60 of the sheets.

Looking now at FIG. 4, a rectangular area 56 is outlined in broken lines on the lower lamina 12. The area 56 is the area on which foamable viscous resin is deposited to form the core 14. The area 56 extends into the unmatted side margins 58 and the unmatted end margins 60, around the mat 16.

The side edges of the area 56 are defined by a pair of vertical plates 62 which are floatingly supported by a pair of brackets 64 so as to rest on the lower surface lamina 12. It will be noted that the plates 62 are contoured at their leading edge to the shape of the upper roller 46 and the movement of the lower lamina 12 in the direction of the arrow 55 will hold the plates 62 against the upper lamina 12. Liquid resin is deposited onto the lower sheet 12 between the plates 62 from a mixing valve 66 which is reciprocated in a direction perpendicular to the arrow 55 on a transverse bar 68. Polyurethane resin and the foam reaction agent are separately supplied to the mixing valve 66 from hoses 70. The hoses 70 lead to suitable storage containers (not shown). The mixing valve 66 supplies resin to a transverse wall or strip 72 of resin on the lower lamina 12 extending continuously between the plates 62 at the nip of the rollers 46 and 48. The wall 72 of resin is of greater quantity than the spacing of the rollers 46 and 48 will permit to pass therebetween at any one time, but if feeds resin between the rollers to form a core of the desired unfoamed thickness. The length of the area 56 which will be covered with resin is determined simply by the amount of resin which is metered from the valve 66. This quantity is carefully controlled.

As previously mentioned, the polyurethane resin which is deposited between the layers 12 to form the core 14 extends into the margins 58 and 60 around the mat 16. It will be seen, however, that outer peripheral portions 74 of the margins 58 remain uncovered with resin. The spaces between the portions 74 of the two laminae 12 are preferably sealed by beads of caulking material 76. The caulking material 76 is positioned on the panel 10 while it still rests on the table 44 and is not removed until after the panel has been transferred to the molding apparatus illustrated in FIG. 7. The caulking material 76 is applied to the margins of the lower layer 12 as it rests on the caul 52. As the sheets are fed between the rolls 46 and 48 the caulking material 76 is brought into sealing contact with the upper level 12. The caulking material 76 further aids in excluding undesired outside air from the space between the panels during the foaming and curing stages.

While the impervious material 30 does not form a part of the final laminate, it is left on the layers 12 during the various processing steps. In particular, the material 30 is desirably left on the layers 12 until after the core 14 has been foamed and cured. This greatly aids in insuring that outside air will not pass through the sheets 12 into the core during foaming and curing. This is important if the layers 12 are at all porous.

Inasmuch as no matting exists within the margins 58 and 60, the resin which is deposited between such margins will have an improved ability to adhere the two sheets together at said margins. The use of a core resin of proper viscosity is also important in this regard. The mats 16 have some tendency to push the two sheets apart and accordingly the elimination of the mats 16 at the margins 58 and 60 improves the seal at said margins. After the foaming and curing of the panel 10, the margins 58 and 60 are trimmed off and discarded. Although they are eventually discarded, the margins 58 and 60 with unmatted resin are important in assuring the integrity of the end product, and perform an important function in permitting the foaming of the core without substantial voids resulting from the entrance of atmospheric air between the layers 12.

The structure illustrated in FIG. 6 is transported from the table 44 and placed between a pair of mold or platen assemblies 78 and 80. The mold assembly 78 will be seen to include a heated upper mold portion 82 and an unheated upper mold portion 84. The mold assembly 80 includes a lower heated mold portion 86 and a lower unheated mold portion 88. The upper and lower mold portions 82 and 86 are heated by a high temperature liquid circulated through heating conduits 90 and 92 formed therein. The heated portions of the mold or platten assemblies activate the foam reaction agent and cause the adjacent portion of the core 14 to expand fully. Of course, it will be appreciated that the mold assemblies 78 and 80 are held in a predetermined relationship in a press during the foaming and curing of the core 14 so that the surface panel 10 is contoured to the shape of such molds. The upper and lower mold portions 84 and 88, being unheated, produce an adjacent core portion 94 which tapers in thickness away from the heated portions of the mold assembly and merges into a flat core portion 96 of uniform reduced thickness and of high density. The formation of the core portions 94 and 96 results from the curing of the core 14 in such areas without the foam reaction agent being fully activated. The resulting core portion 96 is of substantially greater density than the main portion of core 14 and may be clamped or subjected to localized forces with much less tendency to crush. For example, the core portion 96 may have fastener receiving apertures drilled in it and will resist any destructive forces imparted by such fasteners. The desirability of providing areas of increased core density in the foam core 14 will depend upon the desired usage of the panel. It is to be understood that the use of such high density core areas is entirely optional and that various panels may be made by the use of the present invention without incorporating this feature.

As the core 14 is foamed and cured in the mold assembly, the rising core resin lifts the mats 16 and disperses them within the core 14. The two mats 16 comingle within the core 14 to provide greater improved structural strength for the end product. The resulting panel is not only reinforced, but a positive mechanical lock between this core 14 and the sheets 18 is produced. This lock results from the fact that the matting is directly embedded within the plastic saturant 20 of the sheets 18 and the integrity of the panel is not dependent upon mere surface adhesion between the core 14 and its adjacent lamina 12.

What is claimed is:

1. The method of making a laminated panel including the steps of impregnating a porous sheet with a liquid plastic saturant, depositing a loose fiber matting on one side of said sheet, pressing said matting against said sheet to imbed portions of said matting within said saturant, curing said saturant to mechanically lock said matting portions to said saturant but with a substantial portion of said matting projecting from said saturant, depositing a foamable liquid resin on said sheet so as to cover said matting, and causing said resin to foam whereby said matting will disperse within said resin as it expands and whereby said matting will reinforce a major portion of said resin and mechanically hold said resin to said sheet.

2. The method set forth in claim 1 wherein a film of impervious material is applied to the opposite side of said sheet from said matting prior to the curing of its saturant and is not removed from sheet until after the foaming and curing of said core.

3. The method set forth in claim 1 wherein a second sheet having a projecting mat adhered thereto is prepared in the manner recited for the first-mentioned sheet and wherein said second sheet is placed over the resin with its mat in engagement with the resin prior to its being foamed whereby the mats of both sheets will be dispersed within said resin as it is foamed and both sheets will be mechanically held to said foamed resin.

4. The method of forming a laminated panel having a foam plastic core comprising the steps of adhering a mat of loose fiber matting to one side of a first cover sheet having a greater width and length than said mat so as to leave an uncovered margin of said first cover sheet around said mat, depositing a viscous foamable resin or said mat and on said margin surrounding said mat, placing a second cover sheet in covering engagement with said resin, foaming said resin between said sheets, and trimming said margin from said sheet.

5. The method of manufacturing a reinforced foam plastic product including the steps of positioning a fiber matting and a viscous foamable resin between a pair of carrier sheets, passing said sheets, matting and resin between a pair of metering rolls to meter the thickness of the plastic material between said sheets and to fill said matting with said resin and curing and foaming said resin to fill the space between said sheets with said matting being dispersed within said resin whereby said sheets will prevent outside air from passing therethrough into said resins as said resin is being foamed.

6. The method set forth in claim 5 wherein said sheets are air impervious.

7. The method of manufacturing a reinforced foam plastic product including the steps of positioning a fiber matting and a viscous foamable resin between a pair of sheets, passing said sheets, matting and resin between a pair of metering rolls to meter the thickness of resin between said sheets to fill said matting with said resin and to produce intimate contact of said resin with said sheets, placing the assembly thus formed against a contoured die and curing and foaming said resin while the assembly is so positioned.

* * * * *

UNITED STATES PATENT OFFICE
CERTIFICATE OF CORRECTION

Patent No. 3,627,603          Dated December 14, 1971

Inventor(s) James W. Greig

It is certified that error appears in the above-identified patent and that said Letters Patent are hereby corrected as shown below:

Column 1, line 44, after "as it" insert -- is --.

Column 2, line 53, after "saturation", "be" should be -- by --.

Column 2, line 59, after "sprayed" insert -- on --.

Column 3, line 29, before "end", "matted" should be -- unmatted --.

Column 3, line 54, after "but", "if" should be -- it --.

Column 3, line 73, after "upper", "level" should be -- layer --.

Column 5, line 8 (Claim 2, line 4), after "from" insert -- said --.

Column 5, line 23 (Claim 4, line 6), after "resin", "or" should be -- on --

Column 6, line 12 (Claim 5, line 10) after "said", "resins" should be -- resin --.

Signed and sealed this 13th day of June 1972.

(SEAL)
Attest:

EDWARD M. FLETCHER, JR.          ROBERT GOTTSCHALK
Attesting Officer                Commissioner of Patents